United States Patent
Kim (10) Patent No.: US 8,509,608 B2
(45) Date of Patent: Aug. 13, 2013

(54) PHOTOGRAPHING APPARATUS AND METHOD OF DISPLAYING GRAPHIC FOR USER TO ESTIMATE THE REAL SIZE OF OBJECT

(75) Inventor: Se-min Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 12/962,985

(22) Filed: Dec. 8, 2010

(65) Prior Publication Data

US 2011/0157400 A1    Jun. 30, 2011

(30) Foreign Application Priority Data

Dec. 24, 2009 (KR) .......................... 10-2009-130891

(51) Int. Cl.
*G03B 17/00* (2006.01)

(52) U.S. Cl.
USPC ............................................. 396/50; 396/88

(58) Field of Classification Search
USPC ................ 396/50, 88; 348/135–137, 333.02, 348/333.03
See application file for complete search history.

(56) References Cited

U.S. PATENT DOCUMENTS

| | | | | |
|---|---|---|---|---|
| 3,902,182 | A * | 8/1975 | Hillborg | 396/3 |
| 4,716,429 | A * | 12/1987 | Misawa | 396/147 |
| 5,331,419 | A * | 7/1994 | Yamada et al. | 348/64 |
| 6,806,906 | B1 * | 10/2004 | Soga et al. | 348/333.03 |
| 7,683,963 | B2 * | 3/2010 | Huang | 348/348 |
| 2011/0074950 | A1 * | 3/2011 | Oka et al. | 348/137 |

* cited by examiner

*Primary Examiner* — W B Perkey
(74) *Attorney, Agent, or Firm* — Stanzione & Kim, LLP (57) ABSTRACT

A photographing method displays a photographed object and displays a graphic for the user to estimate the real size of the object based on a calculated real size of the object. Accordingly, the user can evaluate the real size of the object, which is being photographed by the user.

36 Claims, 8 Drawing Sheets

PHOTOGRAPHING APPARATUS AND METHOD OF DISPLAYING GRAPHIC FOR USER TO ESTIMATE THE REAL SIZE OF OBJECT

CROSS-REFERENCE TO RELATED APPLICATIONS

This application claims the benefit of priority under 35 U.S.C. §119(a) from Korean Patent Application No. 2009-130891, filed on Dec. 24, 2009, in the Korean Intellectual Property Office, the contents of which are incorporated herein by reference in their entirety.

BACKGROUND OF THE INVENTION

1. Field of the Invention

The present general inventive concept relates to a photographing apparatus, and more particularly, to a photographing apparatus which photographs an object and records a photographed video.

2. Description of the Related Art

Photographing apparatuses such as digital cameras and camcorders may provide on a display additional information in addition to an image of the object that is being photographed. The additional information provided through the display may include a current mode, settings, remaining battery life, consumption status, remaining capacity of a recording medium, and a current time, for example.

Such additional information is useful for users to refer to the information to understand and operate the photographing apparatus.

While the above information may be useful to a user, there is a need to provide additional information regarding a size of an object being photographed.

SUMMARY OF THE INVENTION

The present general inventive concept provides a photographing apparatus and a method of displaying information to estimate the real size of an object when displaying the object being photographed.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a photographing method, including photographing an object, displaying the photographed object, calculating a real size of the object, and displaying a graphic for a user to estimate the real size of the object based on the calculated real size of the object.

The graphic may include grid lines. The grid lines may include grid dots at points where the grid lines intersect, and one of the grid dots on the grid lines may be displayed at a focus point.

A gap between the grid lines may be determined based on at least one of a size of the displayed object, the real size of the object, and the real gap between the grid lines. The gap between the grid lines may be proportional to the size of the displayed object or the real size of the object.

The photographing method may further include adjusting the gap between the grid lines if the user changes the size of the displayed object with a zoom operation.

The gap between the grid lines may be adjusted to be larger if the user enlarges the size of the displayed object with a zoom in operation, and the gap between the grid lines may be adjusted to be smaller if the user decreases the size of the displayed object with a zoom out operation.

The photographing method may further include displaying at least one of the real size of the object, an incline of the photographing apparatus which photographs the object, and the real gap of the grid lines.

The real size of the object may be calculated based on at least one of the incline of the photographing apparatus which photographs the object, the size of the object focused on a photographic element in the photographing apparatus, an angle of view, and a specification of an optical device of the photographing apparatus.

The photographing method may further include recording at least one of the real size of the object and the incline of the photographing apparatus which photographs the object.

The recording may record at least one of the real size of the object and the incline of the photographing apparatus which photographs the object in a header of a file where the photographed object is recorded.

The foregoing and/or other features and utilities of the present general inventive concept may also be achieved by providing a photographing apparatus, including a photographing unit to photograph an object, a GUI generating unit, a display unit to generate the object photographed in the photographing unit and the GUI generated in the GUI generating unit, and a control unit to calculate the real size of object and to control the GUI generating unit to form a graphic for the user to estimate the real size of the object based on the calculated real size of the object as the GUI.

The graphic may include grid lines. The control unit may control the GUI generating unit to display a grid dot on the grid lines at a focus point.

The gap between the grid lines may be determined based on at least one of the size of the displayed object, the real size of the object, and the real gap between the grid lines.

The gap between the grid lines may be proportional to the size of the displayed object or the real size of the object.

The control unit may control the GUI generating unit to adjust the gap between the grid lines if the user changes the size of the displayed object with a zoom operation.

The control unit may control the GUI generating unit to adjust the gap between the grid lines to be larger if the user enlarges the size of the displayed object with a zoom-in operation, and to adjust the gap between the grid lines to be smaller if the user decreases the size of the displayed object with a zoom-out operation.

The control unit may control the GUI generating unit to form at least one of the real size of the object, the incline of the photographing apparatus which photographs the object, and the real gap between the grid lines as the GUI.

The control unit may calculate the real size of the object based on at least one of the incline of the photographing apparatus which photographs the object, the size of the object focused on a photographic element in the photographing apparatus, an angle of view, and a specification of an optical device of the photographing apparatus.

The photographing apparatus may further include a storage unit to record at least one of the real size of the object and the incline of photographing apparatus which photographs the object.

At least one of the real size of the object and the incline of the photographing apparatus which photographs the object may be recorded in a header of a file in which the photographed object is recorded.

Features and/or utilities of the present general inventive concept may be realized by a method of displaying an image including photographing an object with a photographing apparatus, determining a size dimension of the object, displaying the photographed object, and displaying a grid simultaneously with the photographed object, a spacing between lines of the grid corresponding to the determined size dimension of the object.

Determining the size dimension of the object may include determining a height of the object.

Determining a size dimension of the object may include determining an inclination angle of the photographing apparatus with respect to a predetermined plane.

The height of the object may be calculated using the radius of curvature r of a lens of the photographing apparatus and the focus distance f of the lens.

The method may further include, when it is determined that the inclination angle of the photographing apparatus is 0, calculating the height according to the following formula: $H=(2r-f)*H'/(f-r)$, where H is the height of the object, r is the radius of curvature of a lens of the photographing apparatus, and f is a focus distance of the lens.

The method may further include, when it is determined that the inclination angle is not equal to 0, calculating the height according to the following formula: $Y=S*\cos(90°-\theta-\theta')*\tan(90-\theta')-(H/2)*\cos((\theta/2)+\theta')*\tan(90-\theta')-S*\sin(90°-\theta-\theta')+(H/2)*\cos((\theta/2)+\theta')*\tan(\epsilon-(\theta/2))$, where Y is a height of the object in a direction perpendicular to the predetermined plane, S is an incline of the photographing apparatus with respect to the object corresponding to a line intersecting a center focal point of a lens of the photographing apparatus and a bottom-most point of the object, H is a distance corresponding to a line segment having a center point that intersects a line perpendicular to the predetermined plane and passing through a substantially center part of the object, and bounded at the ends by a first line intersecting each of the center focal point of the lens and a top point of the object with respect to the photographing apparatus and a second line that is collinear with the incline S of the photographing apparatus, H being calculated by the formula: $H=(2r-f)*H'/(f-r)$, $\theta$ is defined as an angle in a direction toward the height line segment H defined by an intersection point of the first line and the second line at the center focal point of the lens, and $\theta'$ is defined as an angle in a direction toward the incline S bounded by an intersection of the first line and a line perpendicular to the predetermined plane.

The method may further include adjusting a space between lines of the grid according to a user input.

Adjusting the space between lines of the grid may include adjusting a space between lines of the grid when a user adjusts a zoom of the photographed object.

Adjusting the space between lines of the grid includes adjusting the space between lines of the grid according to a user input to change a unit of measure of adjacent grid lines.

The method further may include displaying tabs to allow a user to adjust a determined size of the object.

The method further may include receiving a user input to select an object to have a size determined.

Features and/or utilities of the present general inventive concept may also be realized by a photographing apparatus including a photographing unit to receive an image corresponding to an object to be photographed and to output electrical signals corresponding to the received image, a display to display the object, and a control unit to determine a size dimension of the object, to generate a grid corresponding to the determined size dimension, and to control the display unit to display the grid simultaneously with the object.

The control unit may determine a height of the object and generates the grid based on the height of the object.

The controller may determine an inclination angle of the photographing apparatus with respect to the object and generates the grid based on the determined inclination angle.

The photographing apparatus may include a gyro to detect the inclination angle of the photographing apparatus and to output data corresponding to the detected inclination angle to the controller.

The size dimension may be the height of the object, the photographing unit may include a lens, and the controller may determine the height of the object based on a focus distance of the lens and a radius of curvature of the lens.

The photographing apparatus may further include a memory device to store data corresponding to the focus distance of the lens and the radius of curvature of the lens, and the controller may access the data corresponding to the focus distance of the lens and the radius of curvature of the lens from the memory device to determine the height of the object.

When the control unit determines that the inclination angle is 0, the control unit may calculate the height according to the following formula: $H=(2r-f)*H'/(f-r)$, where H is the height of the object, r is the radius of curvature of a lens of the photographing apparatus, and f is the focus distance of the lens.

When the control unit determines that the inclination angle is not equal to 0, the control unit calculates the height according to the following formula: $Y=S*\cos(90°-\theta-\theta')*\tan(90-\theta')-(H/2)*\cos((\theta/2)+\theta')*\tan(90-\theta')-S*\sin(90°-\theta-\theta')+(H/2)*\cos((\theta/2)+\theta')*\tan(\epsilon-(\theta/2))$, where Y is a height of the object in a direction perpendicular to the predetermined plane, S is an incline of the photographing apparatus with respect to the object corresponding to a line intersecting a center focal point of the lens of the photographing apparatus and a bottom-most point of the object, H is a distance corresponding to a line segment having a center point that intersects a line perpendicular to the predetermined plane and passing through a substantially center part of the object to form a substantially center vertical axis of the object, the line segment H being bounded at the ends by a first line intersecting each of the center focal point of the lens and a top point of the object with respect to the photographing apparatus and a second line that is collinear with the incline S of the photographing apparatus, H being calculated by the formula: $H=(2r-f)*H'/(f-r)$, where r is the radius of curvature of the lens, and f is the focus distance of the lens, $\theta$ is defined as an angle in a direction toward the height line segment H defined by an intersection point of the first line and the second line at the center focal point of the lens, and $\theta$ is defined as an angle in a direction toward the incline S bounded by an intersection of the first line and a line perpendicular to the predetermined plane.

The photographing apparatus further may include a user input device to receive a user input to adjust a space between lines of the grid.

The user input device may be a zoom button, and the control unit may adjust the space between lines of the grid when a user adjusts a zoom of the photographed object.

The controller may adjust the space between lines of the grid according to a user input to change a unit of measure of adjacent grid lines.

The controller may control the display to display tabs to allow a user to adjust a determined size of the object.

The controller may determine the size of the object based on a user selection of the object among a plurality of objects in the image.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
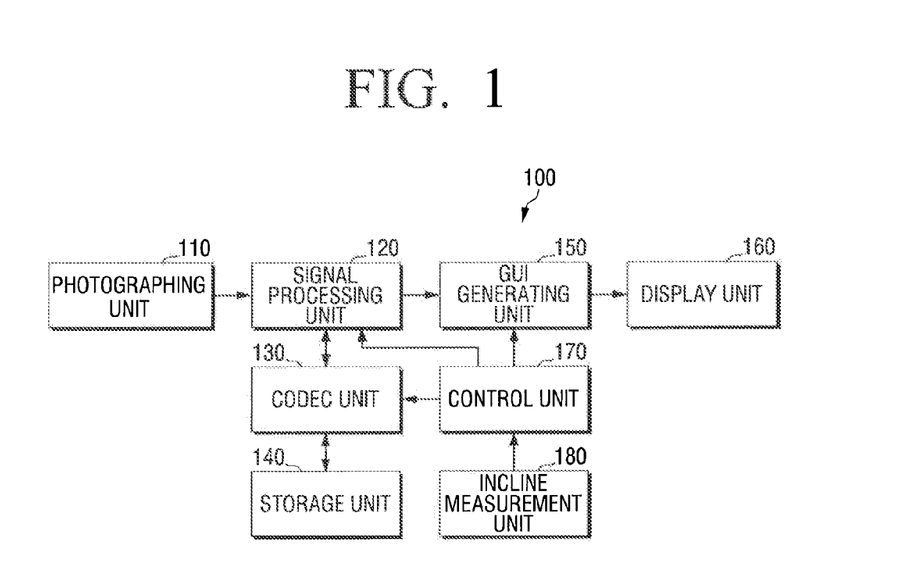
FIG. 1 is a block diagram of a photographing apparatus according to an exemplary embodiment of the present general inventive concept.

FIG. 1 is a block diagram of a photographing apparatus 100 according to an exemplary embodiment of the present general inventive concept. The photographing apparatus 100 may be a digital camera or a digital camcorder. As illustrated in FIG. 1, the photographing apparatus 100 may include a photographing unit 110, a signal processing unit 120, a CODEC unit 130, a storage unit 140, a graphical user interface (GUI) generating unit 150, a display unit 160, a control unit 170, and an incline measurement unit 180.

The photographing unit 110 converts an image of an object, which enters through a lens and is focused onto an optical surface in a photographic element into a video signal. The photographing unit 110 may include a photo-electric surface, for example, that may receive light and convert the light to electrical signals to represent an image of the photographed object. Alternatively, the photographing unit 110 may include any image capture device including a CCD device, or other image capture device. The photographing unit 110 may further include one or more lenses, prisms, other optical units or other processing units to process light and electrical signals, respectively.

The signal processing unit 120 performs a video signal process on the video signal, which is generated by the photographing unit 110. The signal processing unit 120 may include one or more processors, memory, and logic devices.

The CODEC unit 130 compresses the processed video signal from the signal processing unit 120 and generates a video file. The storage unit 140 records the video file generated by the CODEC unit 130 on a record medium.

The storage unit 140 reads out the video file from the record medium and forwards it to the CODEC unit 130. Then, the CODEC unit 130 decompresses the forwarded video file, generates a video signal, and forwards the generated video signal to the signal processing unit 120. The storage unit 140 may include one or more memory devices including an optical disk, magnetic disk, semiconductor-based memory such as RAM or ROM, or any other type of data storage device.

The GUI generating unit 150 generates a GUI and adds the generated GUI to video applied from the signal processing unit 120. A GUI generating process in the GUI generating unit 150 is determined by the control unit 170, which will be explained below. The GUI generating unit 150 may include one or more processors, memory, and logic units. In addition, the GUI generating unit 150 may include a data program stored in memory that causes the control unit 170 to manipulate one or more functional units, such as the display unit 160, the photographing unit 110, and the storage unit 140, to generate the GUI.

The display unit 160 displays a video where a GUI is added by the GUI generating unit 150. A video displayed on the display unit 160 is either a video photographed by the photographing unit 110 or a video stored in the storage unit 140. The display unit 160 may include multiple display units, such as a viewfinder and an LED display, a touch-screen display, or any other type of display device.

The incline measurement unit 180 measures an incline of the photographing apparatus and forwards the measured incline of the photographing apparatus to the control unit 170. The incline measurement unit 180 may be realized as a gyro sensor, for example.

The control unit 170 calculates a real size of an object. The object refers to an object which is focused onto the photographed video. The control unit 170 control the GUI generating unit 150 to display a grid line for a user to estimate the real size of the object along with a photographed video on the display unit 160. The control unit 170 may include one or more processors, memory, and logic units, for example.

A process, where the control unit 170 calculates the real height or size of the object and provides a grid line for the user to estimate the real size of the object, will be explained below.

Figure 2:
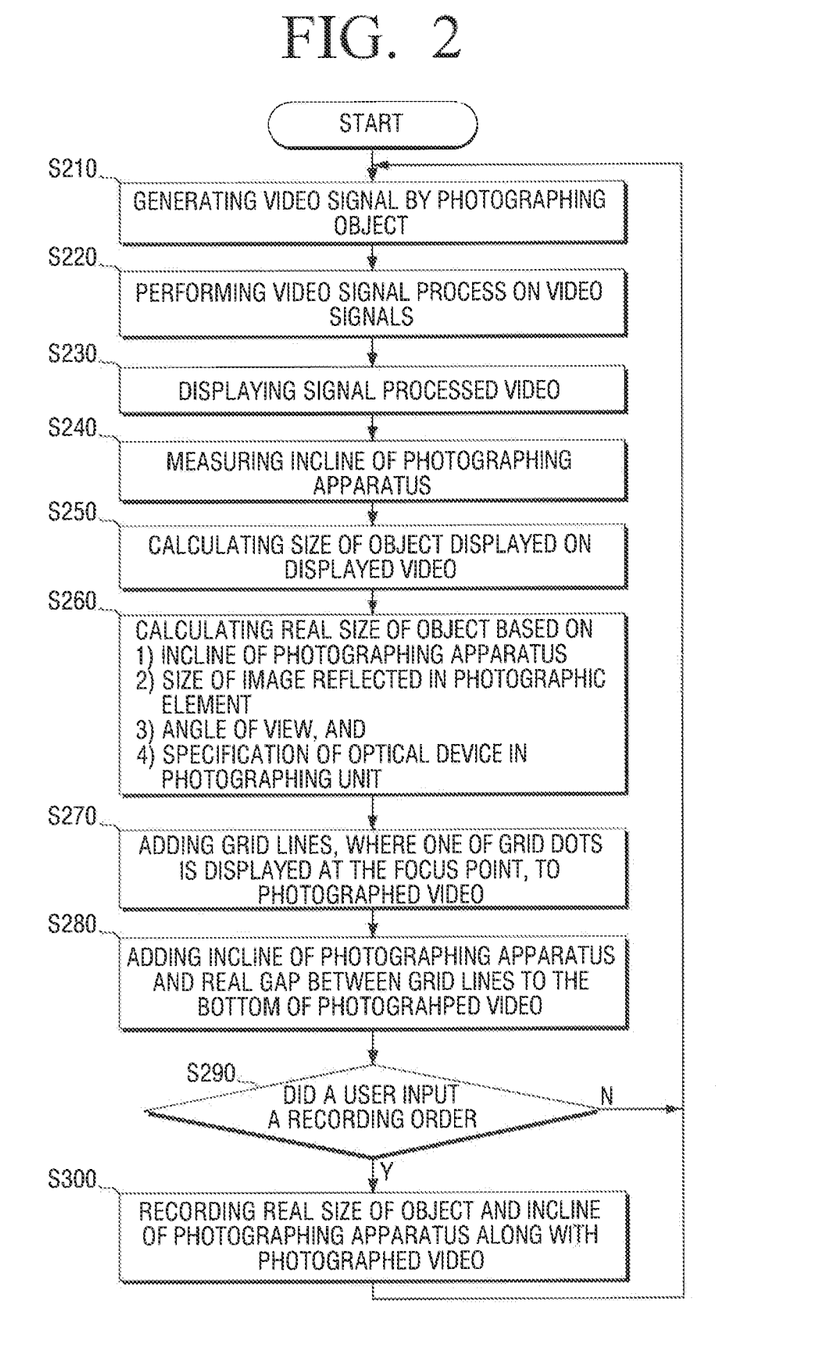
FIG. 2 is a flow chart to illustrate a photographing method according to an exemplary embodiment of the present general inventive concept.

FIG. 2 is a flow chart of a photographing method according to an exemplary embodiment of the present general inventive concept. The photographing method illustrated in FIG. 2 refers to a method of providing a video with an object photographed and of providing grid lines by which a user can estimate the real size of the object.

As illustrated in FIG. 2, in operation S210, the photographing unit 110 generates a video signal by photographing an object. In operation S220, the signal processing unit 120 performs a video signal process on the video signal which is generated in operation S210. In operation S230, the display unit 160 displays the signal processed video in operation S220. Accordingly, the user can identify the object displayed on the photographed video through the display unit 160.

In operation S240, the incline measurement unit 180 measures an incline of the photographing apparatus and forwards the measured incline to the control unit 170. In operation S250, the control unit 170 calculates the height or size of the object displayed on the displayed video in operation S230.

In operation S260, the control unit 170 calculates the real height or size of the object based on 1) an incline of the photographing apparatus, 2) the height or size of the object focused on a photographic element in the photographing unit 110, 3) an angle of view, and 4) the specification of an optical device of the photographing unit 110, such as lens characteristics.

An expression to calculate the real height or size of an object depends on whether the photographing apparatus and the object are parallel to each other or not. Therefore, the incline of the photographing apparatus needs to be considered in calculating the real height or size of the object. A process in which the control unit 170 calculates the real height or size of the object in operation S260 will be explained in detail below.

In operation S260, the control unit 170 determines the gap between the displayed grid lines based on 1) the size of the displayed object calculated in operation S250, 2) the real height or size of an object calculated in operation S260, and 3) the real gap between the grid lines.

The height or size of the displayed object OD, the real height or size OR of the object O, the real gap GR between the grid lines G, and the GD gap between the displayed grid lines G are effective for the below mathematical expression (1). Therefore, the control unit 170 determines the gap GD between the displayed grid lines according to the mathematical expression (2).

$$OD:OR=GD:GR \quad (1)$$

$$GD=(OD*GR)/OR \quad (2)$$

Therefore, if the height or size OD of the displayed object O' is 0.05 m (=5 cm), the real gap GR between the grid lines is 1 m, and the real height or size OR of the object O is 5 m, then the gap GD between the displayed grid lines G is 0.01 m (=0.05*1/5).

According to the mathematical expression (2), it can be determined that the gap GD between the displayed grid lines G is proportional to the height or size OD of a displayed object O' and/or the real height or size OR of the object O. If the height or size OD of the displayed object O' or the real height or size OR of the object O increases with respect to the photographing apparatus 100, such as when a user moves the photographing apparatus 100 closer to the object O, then the gap GD between the displayed grid lines G also increases. Conversely, if the height or size OD of the displayed object O' and/or the real height or size OR of the object O decreases with respect to the photographing apparatus 100, the gap GD between the displayed grid lines G also decreases.

Then, in operation S270, the control unit 170 controls the GUI generating unit 150 to add grid lines to the photographed video and to display the grid lines on the display unit 160. A grid dot may be displayed at the focus point. Moreover, in operation S280, the control unit 170 controls the GUI generating unit 150 to add the incline of the photographing apparatus and the real gap between the grid lines to the bottom of the photographed video and to display them on the display unit 160.

Figure 3:
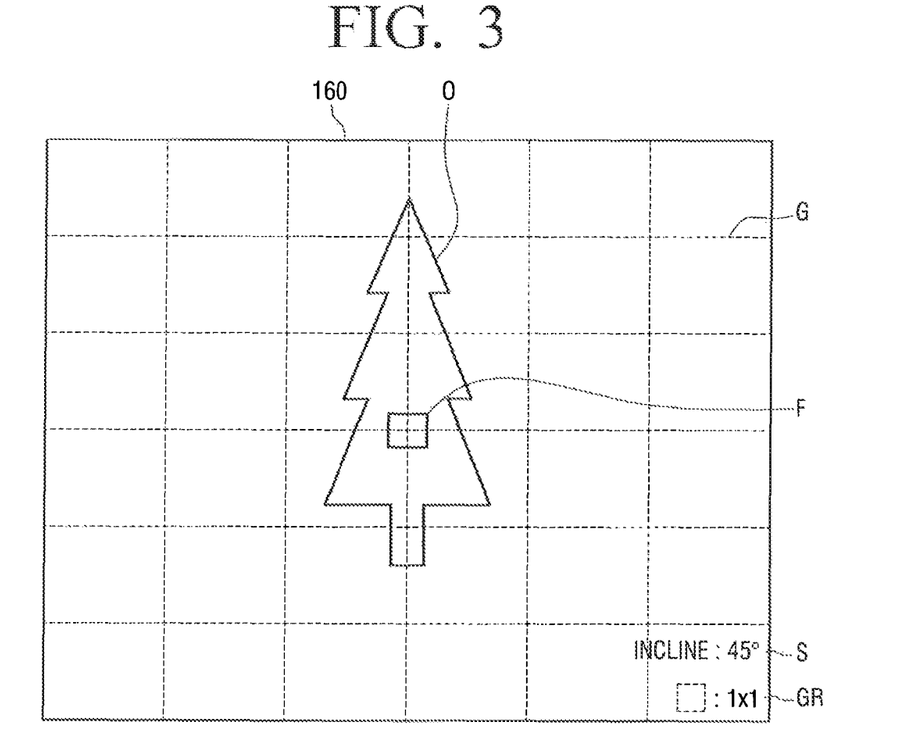
FIGS. 3 and 4 illustrate grid lines shown on a display.

FIG. 3 shows a grid line G, the incline S of the photographing apparatus 100, and the real gap GR between the grid lines G along with an object O displayed as a result of operations S270 and S280. The real gap GR between the grid lines G is defined as a distance that would extend between the grid lines G if the grid lines G were located the same distance from the photographing apparatus 100 as the real object O having the same shape and dimensions with respect to the real object O as the displayed grid lines G on the display 160 have with respect to the displayed object O. In other words, if the grid lines G were projected onto the real object O in the same form as the displayed grid lines G, the gap between the grid lines G projected onto the real object O would be the real gap GR. As illustrated in FIG. 3, one of dots in the grid lines G is located at a focus point F, and the incline S of the photographing apparatus 100 and the real gap GR between the grid lines G are displayed at the bottom of the photographed video.

If the height or size OD of the displayed object O' changes with a zoom operation by a user, the gap GD between the displayed grid lines G also changes. In particular, if the user performs a zoom-in operation, the height or size GD of a displayed object O' also increases, thus increasing the gap between the displayed grid lines GD. Conversely, if the user performs a zoom-out operation, the height or size OD of the displayed object O' also decreases, thus decreasing the gap GD between the displayed grid lines G.

Since the focus point F may be based on known characteristics of a lens or lenses of the photographing apparatus 100, the height or size of the object O can be determined based on the known characteristics of the lens or lenses and the relationship between the real object O and the displayed object O'. For example, if it is known that a lens has a predetermined focal characteristic, and the displayed object O' is in focus on an image-capture device of the photographing apparatus, then the distance between the lens or lenses and the image-capture device may be used to determine a distance to the real object O and the height or size of the real object O.

Figure 4:
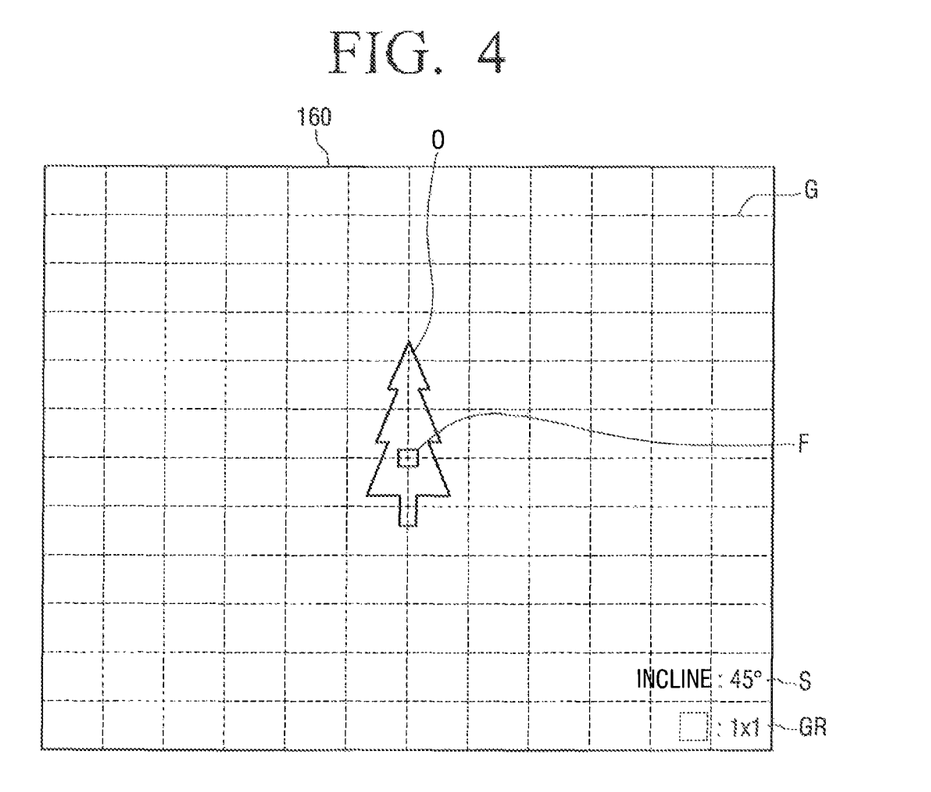

FIG. 4 shows a result where a user performs a zoom-out operation, so that the height or size OD of a displayed object O' and the gap GD between the displayed grid lines G decrease. Even though the height or size OD of the displayed object O' and the gap GD between the displayed grid lines G decrease, the incline S of a photographing apparatus 100 and the real gap GR between the grid lines G remain unchanged. Accordingly, the incline S of the photographing apparatus 100 and the real gap GR between the grid lines G in FIG. 4 are the same as the incline S of the photographing apparatus 100 and the real gap GR between the grid lines G in FIG. 3.

The operations following S280 will be explained in detail with reference to FIG. 2.

In operation S290, it is determined whether a user inputs a recording command. If the user inputs the recording command (S290-Y), the control unit 170 controls the CODEC unit 130 in operation S300 to record the real height or size OR of the object O and the incline S of the photographing apparatus 100 along with a photographed video. Accordingly, the CODEC unit 130 records the real height or size OR of the object O and the incline S of the photographing apparatus 100 in a header of a video file.

Even when a recorded video file is played, displays which are the same as FIG. 3 and FIG. 4 may be provided to a user according to operation S300.

A process to calculate the real height or size of an object mentioned in operation S260 in FIG. 2 will be explained below. The expression to calculate the real height or size of the object depends on whether a photographing apparatus and an object are parallel to each other or not, as mentioned already. Accordingly, each of the cases will be explained below, respectively.

Figure 5:
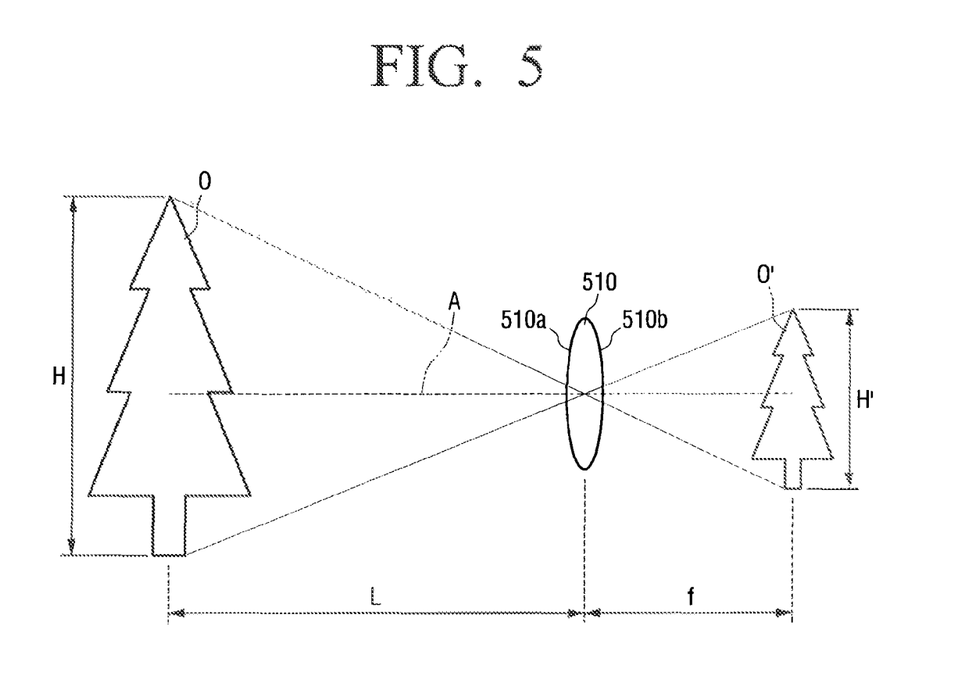
FIG. 5 illustrates a method to calculate the real size of an object if the object and a photographing apparatus are parallel to each other.

FIG. 5 illustrates measuring the real size of an object when an object O and a photographing apparatus 100 are parallel both located along an optical axis A. In other words, FIG. 5 illustrates measuring the real size of the object O when the height H of the object O is perpendicular to an optical axis A of the lens 510 of the photographing apparatus 100. The optical axis A of the photographing apparatus 100 may be defined as line passing through a substantially central point of a lens 510 between a light-receiving side 510a of the lens 510 and a light-emitting side 510b of the lens 510 with respect to the photographing apparatus 100. FIG. 5 is an illustration where an optical image of an object in parallel with the photographing apparatus is focused on a photographic element through a lens.

The below mathematical expressions (3) and (4) are valid under the illustration of FIG. 5.

$$1/L+1/f=1/r \quad (3)$$

$$L=r*f/(f-r) \quad (4)$$

where L is a distance between a lens 510 and an object O, f is a focus distance of the lens 510, and r is a radius of curvature of the lens 510.

Moreover, the below mathematical expressions from (5) to (7) are valid for the focus distance f.

$$f = L*M/(1+M) \quad (5)$$

$$M = H'/H \quad (6)$$

$$f = L*(H'/H)/(1+(H'/H)) \quad (7)$$

where H is the real height of an object O and H' is the height of an object O' focused on a photographic element, such as a photosensitive sensor. After summing up the mathematical expression (7), the below mathematical expression (8) will result.

$$L = f*(H'+H)/H' \quad (8)$$

If the mathematical expression (4) is applied to (8), the mathematical expression (9), which can calculate the real size H of an object O, will result.

$$H = (2r-f)*H'/(f-r) \quad (9)$$

The focus distance f of the lens 510 and the radius of curvature r are specifications of lens 510 located in the photographing unit 110. These values may be stored in the storage unit 140 of the photographing apparatus 100 and accessed by the control unit 170 to calculate the object height H. The height or size of an object H' located on or detected by a photographing element of the photographing unit 110 may be calculated by the control unit 170.

Accordingly, the control unit 170 can measure the real height or size of an object which is parallel to a photographing apparatus 100 (or which has a height H perpendicular to the optical axis A of the photographing apparatus 100) using the mathematical expression (9).

In particular, by using the known focal distance f of the lens 510 and the known radius of curvature r of the lens 510, the height H or size of the object O may be determined, even though the distance between the photographing apparatus 100 and the object O is not known.

Figure 6:
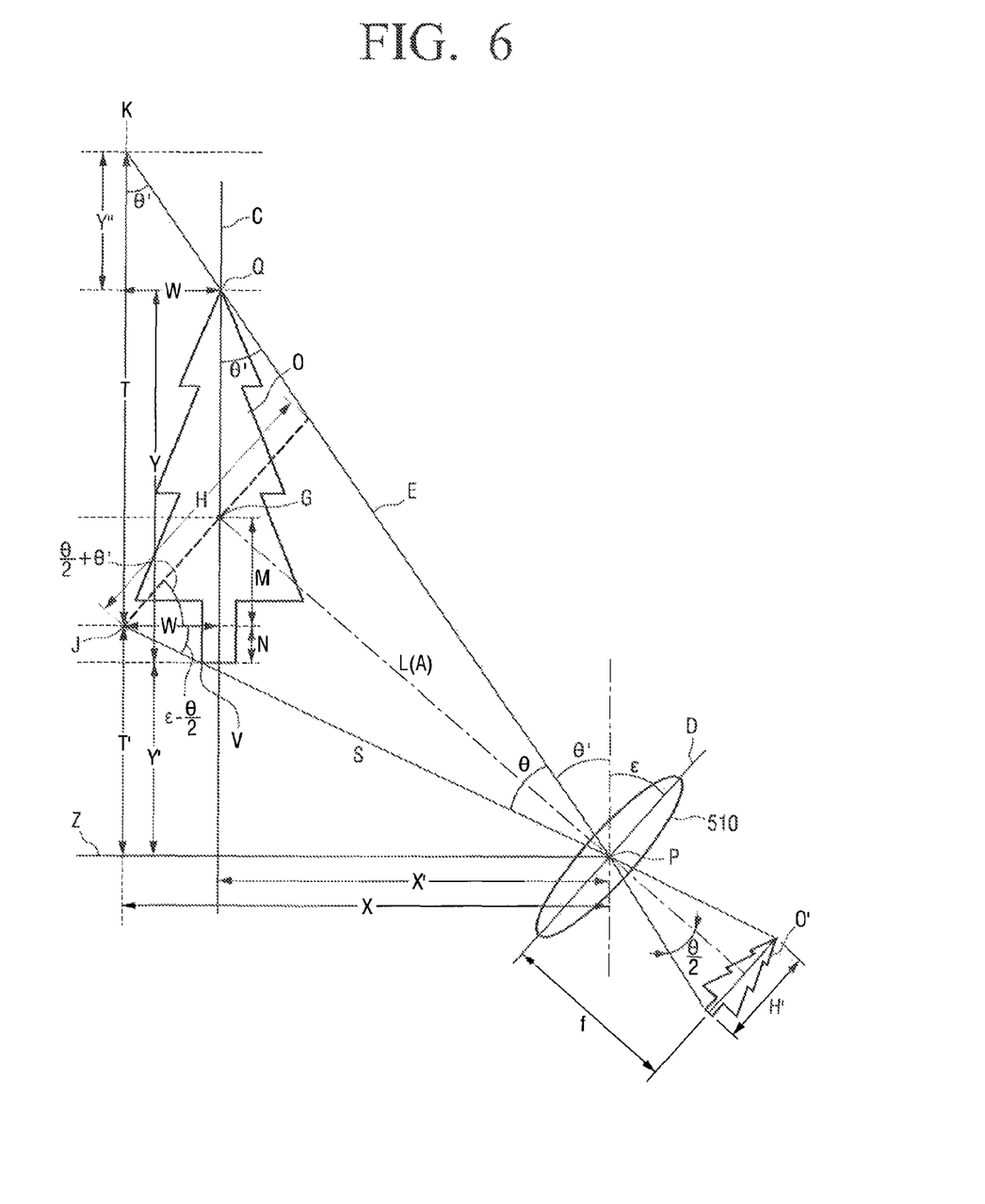
FIG. 6 illustrates a method to calculate the real size of an object if the object and a photographing apparatus are not parallel to each other.

FIG. 6 illustrates measuring the real height or size of an object when an object and a photographing apparatus are not parallel, or when the height Y of the object is not perpendicular to the optical axis A of the lens 510 of the photographing apparatus 100. FIG. 6 is an illustration where an optical image O' of an object which is not in parallel with the photographing apparatus 100 is focused on a photographic element via a lens 510.

The above mathematical expressions (8) and (9) are also valid under the illustration of FIG. 6. However, it needs to be noted that the height or size of an object in FIG. 6 is "Y", not "H".

Mathematical expressions (10) to (14) are valid according to the illustration of FIG. 6.

$$90° = \theta/2 + \theta' + \epsilon \quad (10)$$

$$S^2 = L^2 + (H/2)^2 \quad (11)$$

$$T' = S*\sin(90°-\theta-\theta') \quad (12)$$

$$X = S*\cos(90°-\theta-\theta') \quad (13)$$

$$T+T' = X*\tan(90°-\theta') \quad (14)$$

The lengths of M, W, and N in FIG. 6 are defined according to the mathematical expressions from (15) to (17).

$$M = (H/2)*\sin((\theta/2)+\theta') \quad (15)$$

$$W = (H/2)*\cos((\theta/2)+\theta') \quad (16)$$

$$N = W*\tan(\epsilon-(\theta/2)) = (H/2)*\cos((\theta/2)+\theta')*\tan(\epsilon-(\theta/2)) \quad (17)$$

In FIG. 6, the below mathematical expressions (18) to (23) are valid $$Y'' = W*\tan(90-\theta') = (H/2)*\cos((\theta/2)+\theta')*\tan(90-\theta') \quad (18)$$

$$Y = T-Y''+N = T-(H/2)*\cos((\theta/2)+\theta')*\tan(90-\theta')+(H/2)*\cos((\theta/2)+\theta')*\tan(\epsilon-(\theta/2)) \quad (19)$$

$$Y' = T'-N = T-(H/2)*\cos((\theta/2)+\theta')*\tan(\epsilon-(\theta/2)) \quad (20)$$

$$X = X'+W = X+(H/2)*\cos((\theta/2)+\theta') = S*\cos(90°-\theta-\theta') \quad (21)$$

$$T+T' = Y+Y'+Y'' = Y+Y+(H/2)*\cos((\theta/2)+\theta')*\tan(90-\theta') = X*\tan(90-\theta') \quad (22)$$

$$T' = Y'+N = Y+(H/2)*\cos((\theta/2)+\theta')*\tan(\epsilon-(\theta/2)) = S*\sin(90°-\theta-\theta') \quad (23)$$

The mathematical expression (24) results from the mathematical expression (22), and the mathematical expression (25) results from the mathematical expression (23).

$$Y+Y' = X*\tan(90-\theta')-(H/2)*\cos((\theta/2)+\theta')*\tan(90-\theta') \quad (24)$$

$$Y' = S*\sin(90°-\theta-\theta')-(H/2)*\cos((\theta/2)+\theta')*\tan(\epsilon-(\theta/2)) \quad (25)$$

When the mathematical expressions (21) and (25) are applied to the mathematical expression (24), then the following mathematical expression (26) regarding the real size of an object Y will result as follows:

$$Y = S*\cos(90°-\theta-\theta')*\tan(90-\theta')-(H/2)*\cos((\theta/2)+\theta')*\tan(90-\theta')-S*\sin(90°-\theta-\theta')+(H/2)*\cos((\theta/2)+\theta')*\tan(\epsilon-(\theta/2)) \quad (26)$$

If Y is described with the angle of view θ, and the incline angle ε of a photographing apparatus 100 by applying the mathematical expression (10), the below mathematical expression (27) will result.

$$Y = S*\cos(\epsilon-(\theta/2))*\tan(\epsilon+(\theta/2))-(H/2)*\cos(90°-\epsilon)*\tan(\epsilon+(\theta/2))-S*\sin(\epsilon-(\theta/2))+(H/2)*\cos(90°-\epsilon)*\tan(\epsilon-(\theta/2)) = S*[\cos(\epsilon-(\theta/2))*\tan(\epsilon+(\theta/2))-\sin(\epsilon-(\theta/2))]+(H/2)*\cos(90°-\epsilon)[\tan(\epsilon-(\theta/2))-\tan(\epsilon+(\theta/2))] \quad (27)$$

According to the mathematical expression (11), $$S = \sqrt{L^2 + \left(\frac{H}{2}\right)^2}.$$

According to the mathematical expression (8), L=f*(H'+H)/H'. According to the mathematical expression (9), H=(2r−f)*H'/(f−r). The focus distance 'f' of the lens 510 and an object O and the radius of curvature 'r' are based on specifications of the lens 510, which may be stored in the storage unit 140 or in a memory device of the control unit 170, for example, to be accessed by the control unit 170 to determine the height or size H of the object O. The height or size of the object H', which is focused on a photographed element, the incline ε of the photographing apparatus 100, and the angle of view θ are parameters which can be calculated.

Accordingly, the control unit 170 can calculate the real height or size of an object, which is not parallel to the photographing apparatus, by using the mathematical expression (27).

In FIG. 6, the object O has an actual height Y. The actual height Y corresponds to line segment perpendicular to a predetermined plane, such as a horizontal plane, passing through a lower-most point of the object as viewed by the photographing apparatus 100 and an upper-most point of the object as viewed by the photographing apparatus 100. Since an object O may not be symmetrical, the "bottom point" and the "top point" may not be an actual bottom point or top point of the object or they may be offset from each other in a direction parallel the predetermined plane. Accordingly, the actual height Y may be a value with a predetermined error percentage, for example 5%, or any other predetermined percentage that may be calculated based on a shape of an object, for example.

Since the focus distance f of the lens and the radius of curvature r of the lens are known, the value corresponding to a length of the line segment H can be calculated using the equation (9), above. An inclination angle $\epsilon$ may be determined by the photographing apparatus 100, such as by a gyro or other inclination angle-detecting device. The inclination angle $\epsilon$ is detected with respect to a predetermined plane, such as a horizontal plane. The line segment H is intersected at a center point by the optical axis L (or A) of the lens 510. The optical axis L is defined as a line at which light passing into the lens enters the lens, travels through the lens, and exits the lens, co-linearly, and the optical axis L intersects the substantially center point P of the lens 510.

Based on the known optical axis (see, for example, equation (4)) and the known line segment value H, the incline S may be determined. The incline S is a value corresponding to a line segment bounded at its ends by the lower end of the line segment H and the center point P of the lens 510, respectively.

The angle $\theta$ is defined by the incline S and a first line E that passes through the center point P of the lens 510 and intersects the upper end point of the line segment H. The angle $\theta$ corresponds to the intersection of the incline S and first line E in a direction facing the line segment H, and may be detected by the photographing apparatus 100. Accordingly, the angle $\theta'$ may be calculated according to the equation (10) for example.

A center point G of the line segment H intersects a center axis C of the object O that corresponds to the actual height Y of the object O. In other words, the center axis C of the object is defined as a line running from a substantial center of bottom of the object to a substantial center of a top of the object. Alternatively, the center axis C may be defined relative to a horizontal plane, such that the center axis extends vertically through a center point G of the object O. The center point G of the object may be determined by calculating a height and width dimension of the object, or my any other method. The angle $\theta$ is defined by an intersection point of the lines C and E in the direction of the incline S or facing the incline S.

A distance T may be defined by a line segment parallel to the actual height center axis C of the object that is bounded at one end by the point J and at the other end by the first line E. A distance W may be defined as a distance between the actual height center axis C and the line T.

A distance X is defined by a line segment extending perpendicular to the actual height axis C between the center focal point P of the lens 510 and an axis K that is co-linear with the line segment defining the distance T. A distance X' is defined by a line segment extending perpendicular to the actual height axis C between the center focal point P of the lens 510 and the center height axis C of the object O. A distance T' is defined by a line segment extending between the point J and a line Z extending perpendicular to the actual center height axis C and intersecting the center focal point P of the lens 510. A distance Y' is defined by a line segment extending parallel to the center height axis C of the object O and bounded at a first end by the line Z and at a second end by a line extending parallel to the line Z and passing through the apparent bottom point V of the object O.

A distance Y" is defined by a line segment extending parallel to the actual center height axis C of the object O and bounded at one end by the line E and at the other end by a line extending parallel to the line Z and intersecting the top apparent point Q of the object O. A distance M is defined by a line segment extending perpendicular to the line Z between the apparent center point G and a line extending parallel to the line Z and intersecting the point J. A distance N is defined by a line segment extending perpendicular to the line Z between the apparent bottom point V of the object O and a line extending parallel to the line Z and intersecting the point J.

The grid lines illustrated in the above exemplary embodiments are a kind of graphic based on which a user can estimate the real size of an object. Similarly, another graphic may be generated to allow the user to estimate the real size of the object, such as a graphic depiction of the object, circles or other geometric shapes, or any other appropriate graphic.

The real gap between the grid lines is adjustable, and it is adjustable by a user. If the real gap between the grid lines increases, the gap between the displayed grid lines decreases. If the real gap between the grid lines decreases, the gap between the displayed grid lines increases.

In the above exemplary embodiments, the gap between widths and the gap between heights in the grid lines are same. However, they are just an example. It is possible for the gap between widths and the gap between heights to be different, respectively. To that end, the control unit 170 needs to calculate 1) the size of a displayed object in terms of a width and a length, 2) and the real size of an object in terms of a width and a length. Moreover, the real gap between the grid lines is required to be set for a width and a length.

FIGS. 3 and 4 illustrate that the grid lines G, the incline S of the photographing apparatus 100, and the real gap GR between grid lines G are displayed on the display unit 160 along with an image of the object O. However, grids lines G and others mentioned above displayed with the object O are just an example. It is possible for various graphics or additional information other than the image being photographed to be omitted, and it is possible to include other information that has not been explicitly described.

Figure 7:
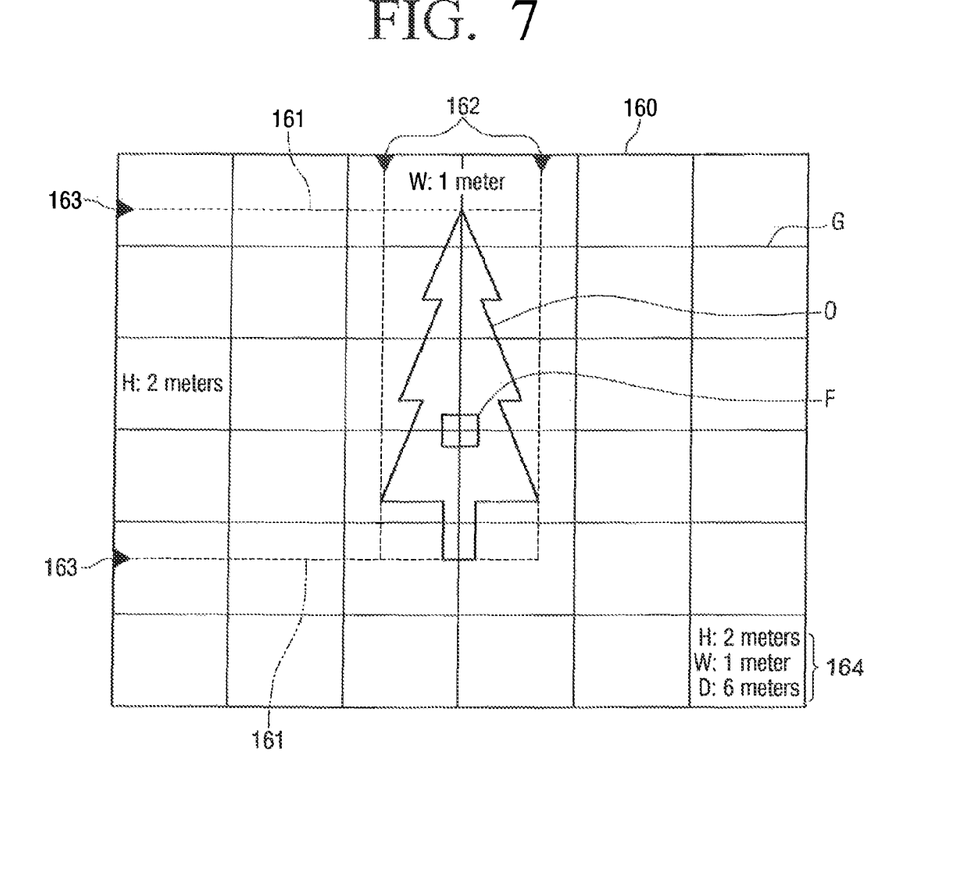
FIG. 7 illustrates a grid display according to an embodiment of the present general inventive concept.

FIG. 7 illustrates additional information that may be displayed. The display 160 may include an image of an object O, a focus point F, grid lines G, and height or size lines 161 to mark limits of the object O in a height or width direction. The display 160 may also include adjustable tabs 162 and 163 to allow a user to increase a height or width measurement. The display may also include the height and width information 164 and distance information D indicating a distance from the photographing apparatus to the object O being photographed.

The calculated height, width, and distance measurements may be displayed at sides of the display 160, in a corner of the display 160 so as to avoid overlapping the image of the object O, or at any other portion of the display 160. Alternatively, the display 160 may include a first display unit to display the image of the object to be photographed and a grid display, and a second display unit to display the measured height, width, and/or distance measurements.

Figure 8:
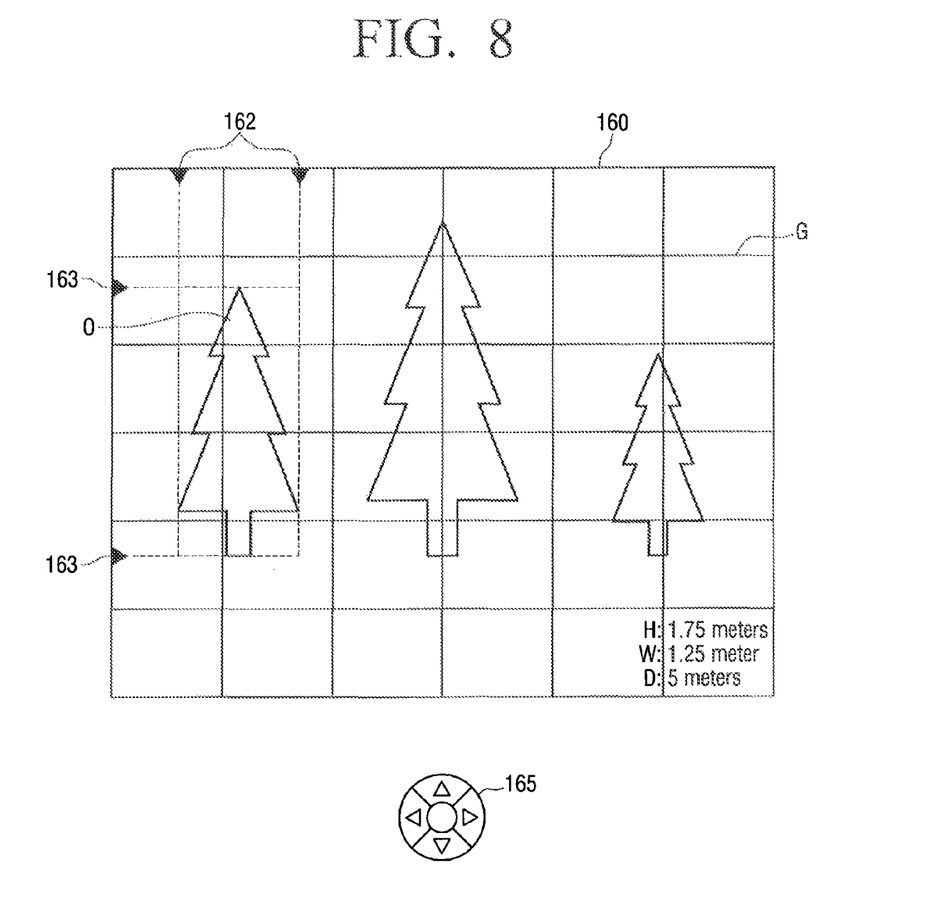
FIG. 8 illustrates another grid display according to an embodiment of the present general inventive concept.

FIG. 8 illustrates a display 160 including images of a plurality of objects. In such a case, the height, width, distance, or other measurements of the object centered on the display may be calculated. Alternatively, the photographing apparatus 100 may include a selection device 165 or a touch-screen to allow a user to select an object O of the plurality of displayed objects for which the height, size, distance, or other measurements will be calculated. For example, in FIG. 8, the object O on the left side of the display 160 is selected by a user and the height H, width W, and distance D of the object O are calculated and displayed by the control unit 170 and display 160.

In the above mentioned exemplary embodiments, a digital camera and a digital camcorder have been mentioned as a photographing apparatus 100. The present general inventive concept can be applied to any other photographing apparatus. For example, any device such as a mobile phone with photographing function, a mobile computer, and other device, which have photographing function, may be used.

As explained thus far, according to this present general inventive concept, the information, which can estimate the real size of an object, can be displayed along with the object which is being photographed. Accordingly, the user can estimate the real size of the object.

According to the present general inventive concept, information on the real size of the object is provided through a graphic, which provides an excellent visual effect such as grid lines, thus improving visual entertainment for a user.

Moreover, even in the case where an object and a camera are not parallel, calculating the real size of an object is possible. The calculated real size of the object can be recorded on a video file, thus enabling a user to use later.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A photographing method, comprising:
photographing an object;
displaying the photographed object;
calculating a real size of the object;
generating grid lines for a user to estimate the real size of the object based on the calculated real size of the object;
displaying the grid lines to be overlap to the photographed object; and
adjusting a gap between the grid lines if the user changes the size of the displayed object with a zoom operation,
wherein the grid lines include grid dots where two grid lines intersect, and one of the grid dots on the grid lines is displayed at a focus point.

2. The photographing method of claim 1, wherein a gap between the grid lines is
determined based on at least one of a size of the displayed object, the real size of the object, and the real gap between the grid lines.

3. The photographing method of claim 2, wherein the gap between the grid lines is proportional to at least one of the size of the displayed object and real size of the object.

4. The photographing method of claim 1, wherein the adjusting the gap between the grid lines comprises:
adjusting the gap between the grid lines to be larger if the user enlarges the size of the displayed object with a zoom in operation; and
adjusting the gap between the grid lines to be smaller if the user reduces the size of the displayed object with a zoom out operation.

5. The photographing method of claim 1, further comprising:
displaying at least one of the real size of the object, an incline of the photographing apparatus which photographs the object, and the real gap between the grid lines.

6. The photographing method of claim 1, wherein calculating the real size of the object includes calculating the real size of the object based on at least one of the incline of photographing apparatus which photographs the object, the size of the object focused on a photographic element in the photographing apparatus, an angle of view of the photographing apparatus, and a specification of an optical device of the photographing apparatus.

7. The photographing method of claim 1, further comprising:
recording at least one of the real size of the object and the incline of the photographing apparatus which photographs the object.

8. The photographing method of claim 7, wherein recording at least one of the real size of the object and the incline of the photographing apparatus includes recording at least one of the real size of the object and the incline of the photographing apparatus which photographs the object in a header of a file where a photographed object is recorded.

9. A photographing apparatus, comprising:
a photographing unit to photograph an object;
a GUI generating unit to generate a GUI;
a display unit to display the object photographed in the photographing unit and the GUI generated in the GUI generating unit; and
a control unit to calculate a real size of the object, to control the GUI generating unit to form grid lines for a user to estimate the real size of the object based on the calculated real size of the object and to control the display unit to displays the grid lines to be overlap to the photographed object,
wherein the control unit controls the GUI generating unit to adjust a gap between the grid lines if the user changes the size of the displayed object with a zoom operation, and
wherein the control unit controls the GUI generating unit to display at least one grid dot on the grid lines at a focus point.

10. The photographing apparatus of claim 9, wherein the gap between the grid lines is determined based on at least one of the size of the displayed object, the real size of the object, and the real gap between the grid lines.

11. The photographing apparatus of claim 10, wherein the gap between the grid lines is proportional to the size of the displayed object and the real size of the object.

12. The photographing apparatus of claim 9, wherein the control unit controls the GUI generating unit to adjust the gap between the grid lines to be larger if the user enlarges the size of the displayed object with a zoom in operation and to adjust the gap between the grid lines to be smaller if the user reduces the size of the displayed object with a zoom out operation.

13. The photographing apparatus of claim 9, wherein the control unit controls the GUI generating unit to form at least one of the real size of the object, the incline of the photographing apparatus which photographs the object, and the real gap between the grid lines as the GUI.

14. The photographing apparatus of claim 9, wherein the control unit calculates the real size of the object based on at least one of the incline of the photographing apparatus which photographs the object, the size of the object focused on a photographic element in the photographing apparatus, an angle of view of the photographing apparatus, and a specification of an optical device of the photographing apparatus.

15. The photographing apparatus of claim 9, further comprising:
a storage unit to record at least one of the real size of the object and the incline of the photographing apparatus which photographs the object.

16. The photographing apparatus of claim 15, wherein at least one of the real size of the object and the incline of the photographing apparatus which photographs the object is recorded in a header of a file where the photographed object is recorded.

17. A method of displaying an image, comprising:
photographing an object with a photographing apparatus;
determining a size dimension of the object and generating a grid based on the size dimension of the object;
displaying the photographed object;
displaying tabs to allow a user to adjust a determined size of the object;
displaying the grid simultaneously with the photographed object, a spacing between lines of the grid corresponding to the determined size dimension of the object, and
adjusting the spacing between lines of the grid if the user changes the size of the displayed object with a zoom operation.

18. The method according to claim 17, wherein determining the size dimension of the object includes determining a height of the object.

19. The method according to claim 17, wherein determining a size dimension of the object includes determining an inclination angle of the photographing apparatus with respect to a predetermined plane.

20. The method according to claim 19, wherein the size dimension is a height of the object, and
the height of the object is calculated using the radius of curvature of a lens of the photographing apparatus and the focus distance of the lens.

21. The method according to claim 20, further comprising, when it is determined that the inclination angle of the photographing apparatus is 0, calculating the height according to the following formula:
$H=(2r-f)*H'/(f-r)$, where H is the height of the object, r is the radius of curvature of the lens, and f is the focus distance of the lens.

22. The method according to claim 20, further comprising, when it is determined that the inclination angle is not equal to 0, calculating the height according to the following formula:

$$Y=S*\cos(90°-\theta-\theta')*\tan(90-\theta')-(H/2)*\cos((\theta/2)+\theta')*\tan(90-\theta')-S*\sin(90°-\theta-\theta')+(H/2)*\cos((\theta/2)+\theta')*\tan(\epsilon-(\theta/2)),$$

wherein Y is a height of the object in a direction perpendicular to the predetermined plane,
S is an incline of the photographing apparatus with respect to the object corresponding to a line intersecting a center focal point of a lens of the photographing apparatus and a bottom-most point of the object,
H is a distance corresponding to a line segment having a center point that intersects a line perpendicular to the predetermined plane and passing through a substantially center part of the object, and bounded at the ends by a first line intersecting each of the center focal point of the lens and a top point of the object with respect to the photographing apparatus and a second line that is col-linear with the incline S of the photographing apparatus, H being calculated by the formula:
$H=(2r-f)*H'/(f-r)$, where r is the radius of curvature of the lens, and f is the focus distance of the lens,
$\theta$ is defined as an angle in a direction toward the height line segment H defined by an intersection point of the first line and the second line at the center focal point of the lens, and
$\theta'$ is defined as an angle in a direction toward the incline S bounded by an intersection of the first line and a line perpendicular to the predetermined plane.

23. The method according to claim 17, wherein adjusting the space between lines of the grid includes adjusting a space between lines of the grid when a user adjusts a zoom of the photographed object.

24. The method according to claim 17, wherein adjusting the space between lines of the grid includes adjusting the space between lines of the grid according to a user input to change a unit of measure of adjacent grid lines.

25. The method according to claim 17, further comprising:
receiving a user input to select an object to have a size determined.

26. A photographing apparatus, comprising:
a photographing unit to receive an image corresponding to an object to be photographed and to output electrical signals corresponding to the received image;
a display to display the object; and
a control unit to determine a size dimension of the object, to generate a grid corresponding to the determined size dimension, and to control the display unit to display the grid simultaneously with the object,
wherein the control unit adjusts spacing between lines of the grid if the user changes the size of the displayed object with a zoom operation
wherein the controller controls the display to display tabs to allow a user to adjust a value corresponding to the determined size of the object.

27. The photographing apparatus according to claim 26, wherein the control unit determines a height of the object and generates the grid based on the height of the object.

28. The photographing apparatus according to claim 26, wherein the controller determines an inclination angle of the photographing apparatus with respect to a predetermined plane and to generate the grid based on the determined inclination angle.

29. The photographing apparatus according to claim 28, further comprising a gyro to detect the inclination angle of the photographing apparatus and to output data corresponding to the detected inclination angle to the controller.

30. The photographing apparatus according to claim 28, wherein the size dimension is a height of the object,
the photographing unit includes a lens, and
the controller determines the height of the object based on a focus distance of the lens and a radius of curvature of the lens.

31. The photographing apparatus according to claim 30, further comprising:
a memory device to store data corresponding to the focus distance of the lens and the radius of curvature of the lens,
wherein the controller accesses the data corresponding to the focus distance of the lens and the radius of curvature of the lens from the memory device to determine the height of the object.

32. The photographing apparatus according to claim 30, wherein when the control unit determines that the inclination angle is 0, the control unit calculates the height according to the following formula:

$$H=(2r-f)*H'/(f-r),$$

where H is the height of the object, r is the radius of curvature of a lens of the photographing apparatus, and f is the focus distance of the lens.

33. The photographing apparatus according to claim 30, wherein when the control unit determines that the inclination angle is not equal to 0, the control unit calculates the height according to the following formula:

$$Y=S*\cos(90°-\theta-\theta')*\tan(90-\theta')-(H/2)*\cos((\theta/2)+\theta')*\tan(90-\theta')-S*\sin(90°-\theta-\theta')+(H/2)*\cos((\theta/2)+\theta')*\tan(\epsilon-(\theta/2)),$$

where Y is a height of the object in a direction perpendicular to the predetermined plane, S is an incline of the photographing apparatus with respect to the object corresponding to a line intersecting a center focal point of the lens of the photographing apparatus and a bottom-most point of the object, H is a distance corresponding to a line segment having a center point that intersects a line perpendicular to the predetermined plane and passing through a substantially center part of the object to form a substantially center vertical axis of the object, the line segment H being bounded at the ends by a first line intersecting each of the center focal point of the lens and a top point of the object with respect to the photographing apparatus and a second line that is collinear with the incline S of the photographing apparatus, H being calculated by the formula: H=(2r−f)*H'/(f−r), where r is the radius of curvature of the lens, and f is the focus distance of the lens, θ is defined as an angle in a direction toward the height line segment H defined by an intersection point of the first line and the second line at the center focal point of the lens, and θ' is defined as an angle in a direction toward the incline S bounded by an intersection of the first line and a line perpendicular to the predetermined plane.

34. The photographing apparatus according to claim 26, wherein the user input device is a zoom button, and
the control unit adjusts the space between lines of the grid when a user adjusts a zoom of the photographed object.

35. The photographing apparatus according to claim 26, wherein the controller adjusts the space between lines of the grid according to a user input to change a unit of measure of adjacent grid lines.

36. The photographing apparatus according to claim 26, wherein the controller determines the size of the object based on a user selection of the object among a plurality of objects in the image.

* * * * *